(12) United States Patent
Madhusudan et al.

(10) Patent No.: US 7,676,033 B2
(45) Date of Patent: Mar. 9, 2010

(54) METHODS, SYSTEMS, AND COMPUTER PROGRAM PRODUCTS FOR AUTOMATICALLY ESTABLISHING A CONFERENCE CALL HAVING A PLURALITY OF DIFFERENT SUBSCRIBER PARTICIPATION CLASSES

(75) Inventors: Subash Madhusudan, Dallas, TX (US); Sunil Devireddy, Dallas, TX (US); Gary L. Brannick, Plano, TX (US)

(73) Assignee: BroadSoft M6, LLC, Gaithersburg, MD (US)

( * ) Notice: Subject to any disclaimer, the term of this patent is extended or adjusted under 35 U.S.C. 154(b) by 1194 days.

(21) Appl. No.: 11/216,470

(22) Filed: Aug. 31, 2005

(65) Prior Publication Data

US 2007/0047715 A1    Mar. 1, 2007

(51) Int. Cl.
*H04M 3/42* (2006.01)
(52) U.S. Cl. .................. 379/202.01; 379/204.01; 379/205.01; 455/416
(58) Field of Classification Search .............. 455/416; 709/205; 714/48; 379/202.01, 203.01, 204.01, 379/205.01
See application file for complete search history.

(56) References Cited

U.S. PATENT DOCUMENTS

| | | | |
|---|---|---|---|
| 4,232,198 A | 11/1980 | Warman | |
| 5,544,237 A | 8/1996 | Bales et al. | |
| 5,559,876 A | 9/1996 | Alperovich | |
| 5,631,904 A | 5/1997 | Fitser et al. | |
| 6,038,304 A | 3/2000 | Hart | |
| 6,606,505 B1 | 8/2003 | Chow et al. | |
| 2003/0046344 A1* | 3/2003 | Kumhyr et al. | 709/205 |
| 2007/0011498 A1* | 1/2007 | Shaffer et al. | 714/48 |

FOREIGN PATENT DOCUMENTS

WO    WO 03/069945 A1    8/2003

OTHER PUBLICATIONS

Notification of Transmittal of the International Search Report and the Written Opinion of the International Searching Authority, or the Declaration for International Application No. PCT/US06/33845 (Sep. 12, 2007).

\* cited by examiner

*Primary Examiner*—Thjuan K Addy
(74) *Attorney, Agent, or Firm*—Jenkins, Wilson, Taylor & Hunt, P.A.

(57) ABSTRACT

Methods, systems, and computer program products for automatically establishing a conference call having a plurality of different subscriber participation classes includes maintaining at least one per conference call subscriber participation class list. The per conference call subscriber participation class list indicates contact information for a plurality of different subscribers and corresponding subscriber participation classes for the conference call. When a conference call is initiated, the call is automatically established using the contact information and the subscriber participation classes stored in the per conference call subscriber participation class list.

47 Claims, 5 Drawing Sheets

METHODS, SYSTEMS, AND COMPUTER PROGRAM PRODUCTS FOR AUTOMATICALLY ESTABLISHING A CONFERENCE CALL HAVING A PLURALITY OF DIFFERENT SUBSCRIBER PARTICIPATION CLASSES

TECHNICAL FIELD

The subject matter described herein relates to establishing conference calls between telecommunications subscribers. More particularly, the subject matter described herein relates to methods, systems, and computer program products for automatically establishing a conference call having a plurality of different subscriber participation classes.

RELATED ART

In telecommunications conferencing systems, there are a variety of different ways for establishing a conference call between desired participants. For example, one type of conferencing system, referred to as a meet-me conferencing system, requires that each desired participant dial a predetermined conference number. The conference number corresponds to a conference bridge at a telecommunications switch. The conference bridge is usually controlled by a host that has the ability to perform administrative actions, such as initiating the conference, terminating the conference, and locking the conference from further participation. One advantage of a meet-me conference is that the initiating subscriber is not required to manually dial the directory numbers associated with all of the participants. However, one disadvantage is that the conference call must be prearranged, and the participants must remember to dial in at the prearranged time.

Another type of conventional conference call is a manual dial out conference that requires the initiator to dial the number of each participant in the call. One advantage of this type of conference when compared to a conventional meet-me conference is that the participants other than the initiator are not required to dial the conference number. However, one disadvantage is that the initiator must manually dial all of the subscriber numbers. In addition, if a subscriber is unavailable, the initiator may not be able to include that subscriber in the conference.

In order to overcome the difficulties associated with meet-me and manual dial out conferences, automatic dial out conferencing systems have been developed. For example, in one conventional automatic dial out conferencing system, an initiator can define and store in a conferencing system a dial out list of participants in a conference call. In order to initiate a conference call, the initiator accesses the conferencing system and instructs the system to dial all the participants in the list. The conferencing system then attempts to dial each subscriber in the list. One advantage of an automatic dial out conferencing system over a manual dial out conferencing system is that the time required to initiate the conference call is reduced.

A disadvantage associated with all of the above-referenced conferencing systems is that these conferencing systems lack the ability to set up a conference call that has aspects of a physical conference room. For example, it may be desirable to have required participants for a conference call, subscribers who are notified of a conference call and not required to participate, allowed subscribers, who are not alerted, but who are allowed to participate, etc. Such subscriber participation classes are analogous to participation in a physical conference room. For example, if a product manager calls a meeting, developers may be mandatory participants to the meeting. Administrative staff may be notified of the meeting and allowed to participate if necessary. Still others, such as summer interns, may be allowed to participate, but may not be notified of the conference.

Conventional telecommunications conferencing systems lack the flexibility to define a conference call that includes different subscriber participation classes. For example, in the automatic dial out conferencing system described above, there is only a single subscriber participation class, i.e. a subscriber who is dialed for the call. Similarly, in meet-me and manual-dial-out conferencing systems, the only subscriber participation class is a participant in the call.

Accordingly, in light of the difficulties associated with conventional conferencing systems, there exists a need for improved methods, systems, and computer program products for automatically establishing a conference call having different subscriber participation classes.

SUMMARY

According to one aspect, the subject matter described herein includes a method for automatically establishing a conference call having different subscriber participation classes. The method includes maintaining at least one list of subscriber contact information for a conference call. The at least one list defines different subscriber participation classes for the conference call. The conference call having the different subscriber participation classes is established in accordance with the at least one list.

A subscriber participation class list, as described herein, may be a list defining one or more classes of required subscriber participation in a conference call. For example, a first class of subscribers may be required participants in a conference call who are required to participate in the call. A second class of subscribers may be notify subscribers who are notified of the conference call but who are not required to participate. A third class of subscribers may include allowed subscribers who are not notified of the call but who are allowed to participate by dialing in to the call.

The subject matter described herein may be implemented using a computer program product comprising computer executable instructions embodied in a computer readable medium. Exemplary computer readable media suitable for implementing the subject matter described herein include disc memory devices, chip memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
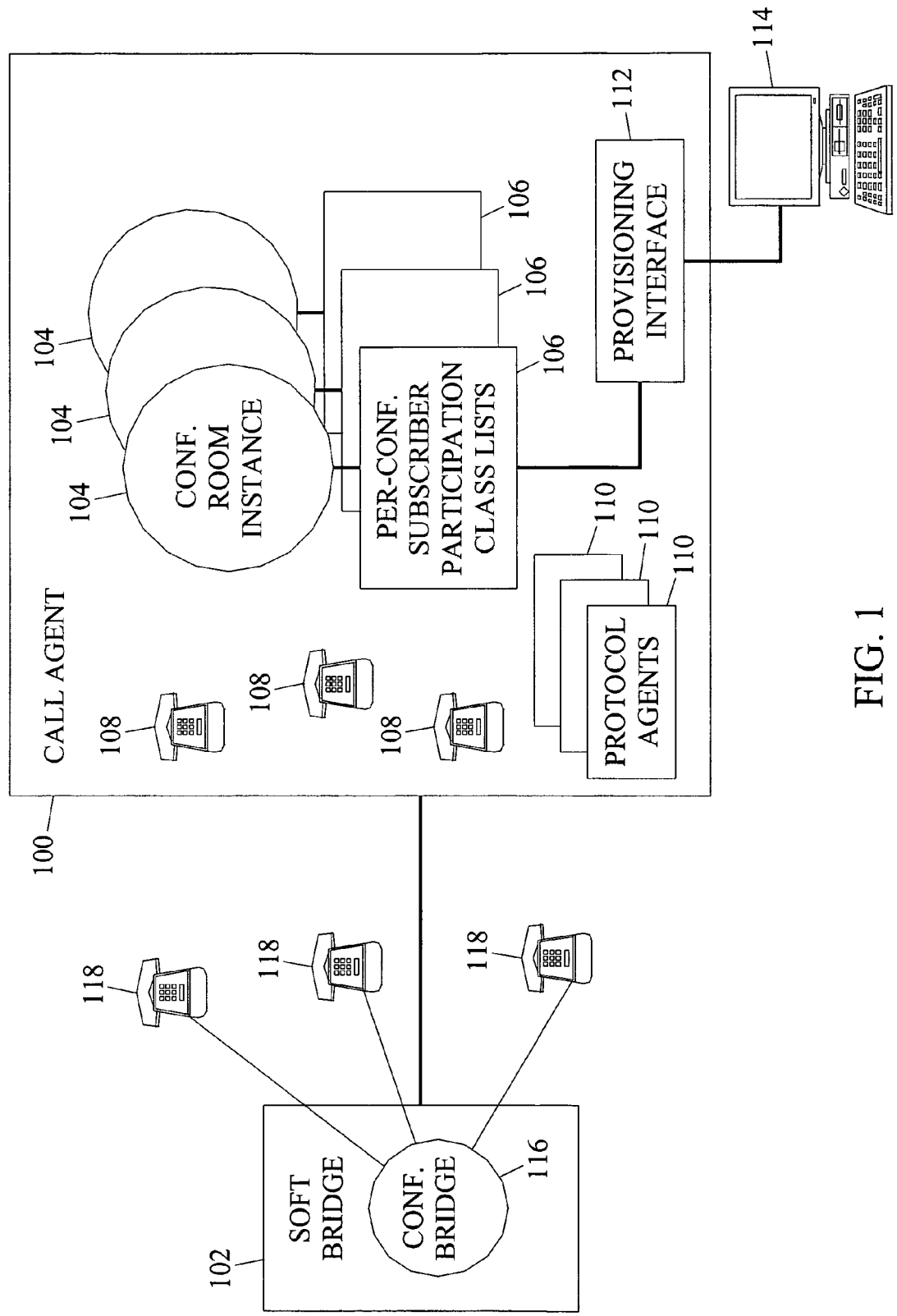
FIG. 1 is a block diagram of a system for automatically establishing a conference call including different subscriber participation classes according to an embodiment of the subject matter described herein.

According to one aspect, the subject matter described herein includes a system for automatically establishing a conference call including different subscriber participation classes. FIG. 1 is a block diagram illustrating an exemplary hardware and software architecture of such a system. Referring to FIG. 1, the architecture includes a call agent 100 and soft bridge 102. Call agent 100 maintains a plurality of conference room instances 104 that stores parameters associated with automatically setting up a conference call having different subscriber participation classes. Each conference room instance 104 may store at least one per conference call subscriber participation class list 106 that indicates subscriber contact information and a participation class for the subscriber. The subscriber contact information may be indicated by a pointer or a direct reference to a phone instance 108 stored by call agent 100. Phone instances 108 may include subscriber contact information, such as subscriber directory numbers or IP addresses, and other data associated with contacting the subscriber, such as the signaling protocol used by the subscribers phone. Call agent 100 may further include a plurality of protocol agents 110 that implement the various protocols for contacting subscriber phones. Exemplary protocols include PSTN protocols, such as ISUP and ISDN PRI protocols and IP telephony protocols, such as SIP and H.323.

In one exemplary implementation, each conference room instance 104 includes a plurality of per conference call subscriber participation class lists 106, where one list corresponds to each different subscriber participation class. Examples of different types of lists that may be included in per conference subscriber participation class lists 106 are as follows:

1) Required List: A list of people who receive a call alert when a conference becomes active. The user, when alerted, has an option to opt out of the conference. If the alerting call is answered, the user is immediately placed into the conference.
2) Allowed List: A list of people who can join the conference by dialing in. A user in this type of list does not get an audible alert to join the conference but is allowed to dial in to an active conference at any given time.
3) Notify List: A list of people who will receive a notification indicating the state of the conference and the conference participants. Generally this notification is sent when the conference becomes active or inactive and when members join and leave the conference.
4) VIP Lists: A list of people with special privileges or list of moderators. A VIP can dial the direct inward dialing (DID) number of the conference room to join the conference and activate it. If the conference is already activated as a result of any previously joined VIP, the VIP will simply join the conference. The conference becomes active as soon as the first VIP joins the conference. On activation, the conference will alert other parties configured in the required participant list and send a notification, such as an audible or visual indicator, to parties in the notification list.

By storing a plurality of different lists that define different subscriber participation classes, call agent 100 facilitates automatic setup of a conference call. In order to allow a subscriber to create and modify such lists, call agent 100 may include a provisioning interface 112 that communicates with a subscriber terminal 114. Provisioning interface 112 may be any suitable interface that allows subscribers to edit entries in a database. For example, provisioning interface 112 may include a web interface that presents a user with HTML forms corresponding to the per call subscriber participation class lists. Alternatively, provisioning interface 112 may be an interactive voice response system that allows a conference initiator to define per call subscriber participation class lists 106 using telecommunications handset keypad or using speech commands.

The subject matter described herein is not limited to defining a plurality of per conference call subscriber participation class lists where each list corresponds to a different subscriber participation class in order to implement different subscriber participation classes for a conference call. For example, in an alternate implementation, each conference room instance 104 may include a single per conference call subscriber participation class list that includes subscriber contact identification information for each subscriber and a corresponding participation class. Table 1 shown below illustrates an example of such a list.

TABLE 1

Per Conference Subscriber Participation Class list for a Single List Implementation

| Subscriber Contact Identification Information | Participation Class |
|---|---|
| Phone Instance #1 | Required |
| Phone Instance #2 | Allowed |
| Phone Instance #3 | Notify |
| Phone Instance #5 | VIP |

Soft bridge 102 includes hardware and software for setting up the media stream connections with subscribers that participate in the conference call. In the illustrated example, soft bridge 102 includes a conference bridge 116 that establishes media streams with subscriber phones 118, mixes the media streams, and transmits the mixed media streams to each subscriber phone 118. In one implementation, conference bridge 116 may include real time transmission protocol (RTP) hardware and software for implementing the media stream connections with subscriber phones 118.

In operation, when it is desirable to establish a conference call, call agent 100 dials the numbers specified by the per conference subscriber participation class lists 106 and the phone instances 108. Call agent 100 implements the signaling required to establish the conference call. Soft bridge 102 sets up media stream connections with each conference participant. When a subscriber terminates his or her connection to the conference bridge, call agent 100 implements the signaling required to terminate that subscriber's connection.

In one exemplary implementation, call agent 100 may be located on any suitable hardware platform capable of executing signaling software and storing conference data. In one exemplary implementation, call agent 100 is implemented on a SUN® hardware platform executing the Solaris® operating system. Call agent 100 may be separate from subscriber phones 118. In such an implementation, a subscriber may initiate a conference by dialing a direct inward dialing number corresponding to call agent 100, and call agent 100 may initiate the signaling required to add, notify, or invite participants to the conference.

In an alternate implementation, call agent 100 may be implemented on a subscriber's phone. In such an implementation, in order to initiate a conference, the conference room instance component located on the subscriber's phone may dial the individual participant numbers and implement the signaling protocols to invite, notify, or allow subscribers to participate in the conference in accordance with the per conference subscriber participation class list.

Soft bridge 102 may be implemented using any hardware and software platform capable of establishing and mixing media stream connections between user's phones. In one example, soft bridge 102 may be implemented on a Intel® server platform executing a VxWorks® operating system.

Figure 2:
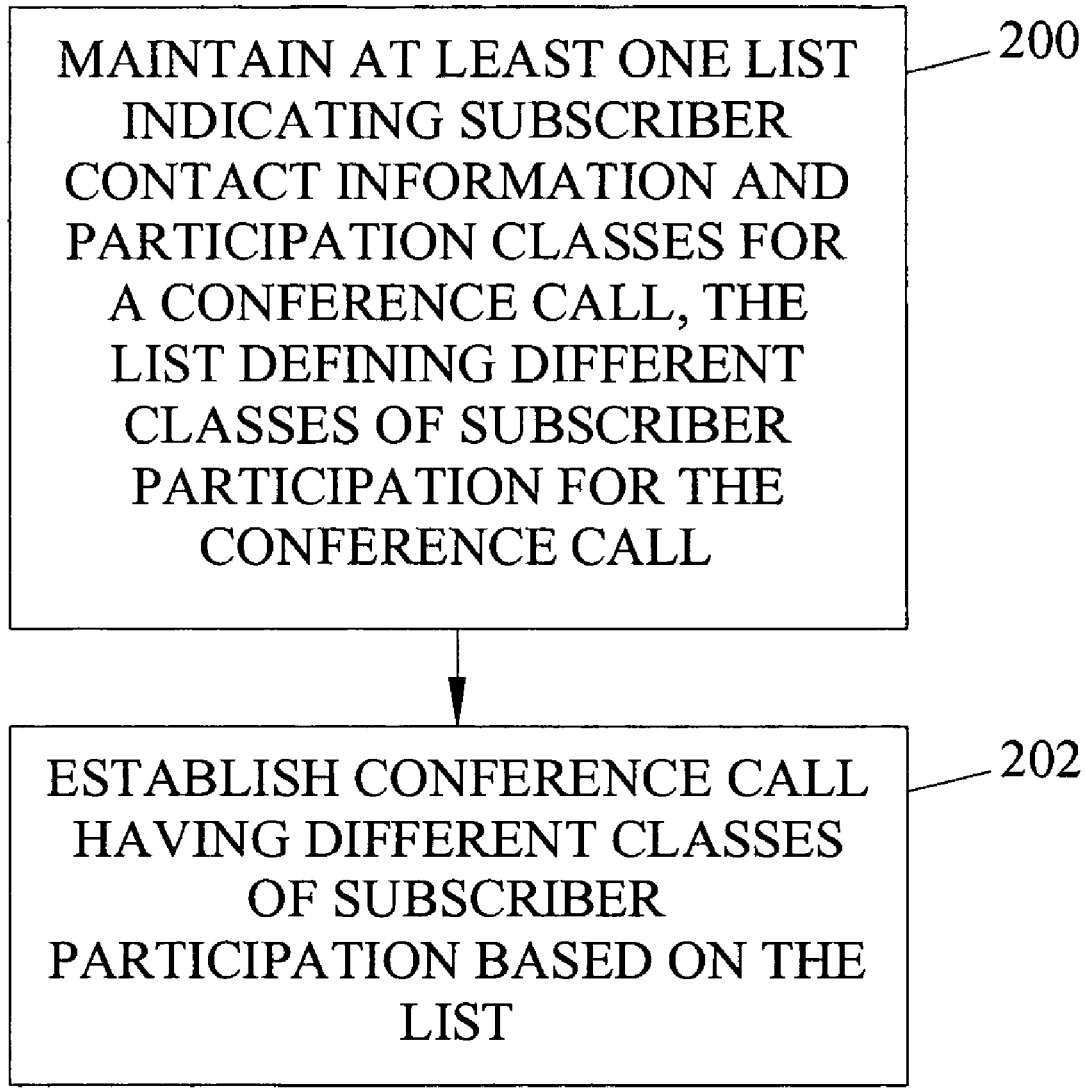
FIG. 2 is a flow chart illustrating exemplary steps of a method for automatically establishing a conference call having different subscriber participation classes according to an embodiment of the subject matter described herein.

FIG. 2 is block diagram illustrating exemplary overall steps for establishing a conference call including a plurality of different subscriber participation classes according to an embodiment of the subject matter described herein. Referring to FIG. 2, in step 200 at least one list indicating subscriber contact information and corresponding subscriber participation classes for a conference call is maintained. In one example, the list defines a hierarchy of different subscriber participation classes for the call. The list may include any of the lists mentioned above or any other suitable list that defines different subscriber participation classes for a conference call. In step 202, the conference call having different subscriber participation classes is established based on the list. The call may be established using signaling performed by call agent 100 and media connection establishment and mixing performed by soft bridge 102, as described above.

Figure 3A:
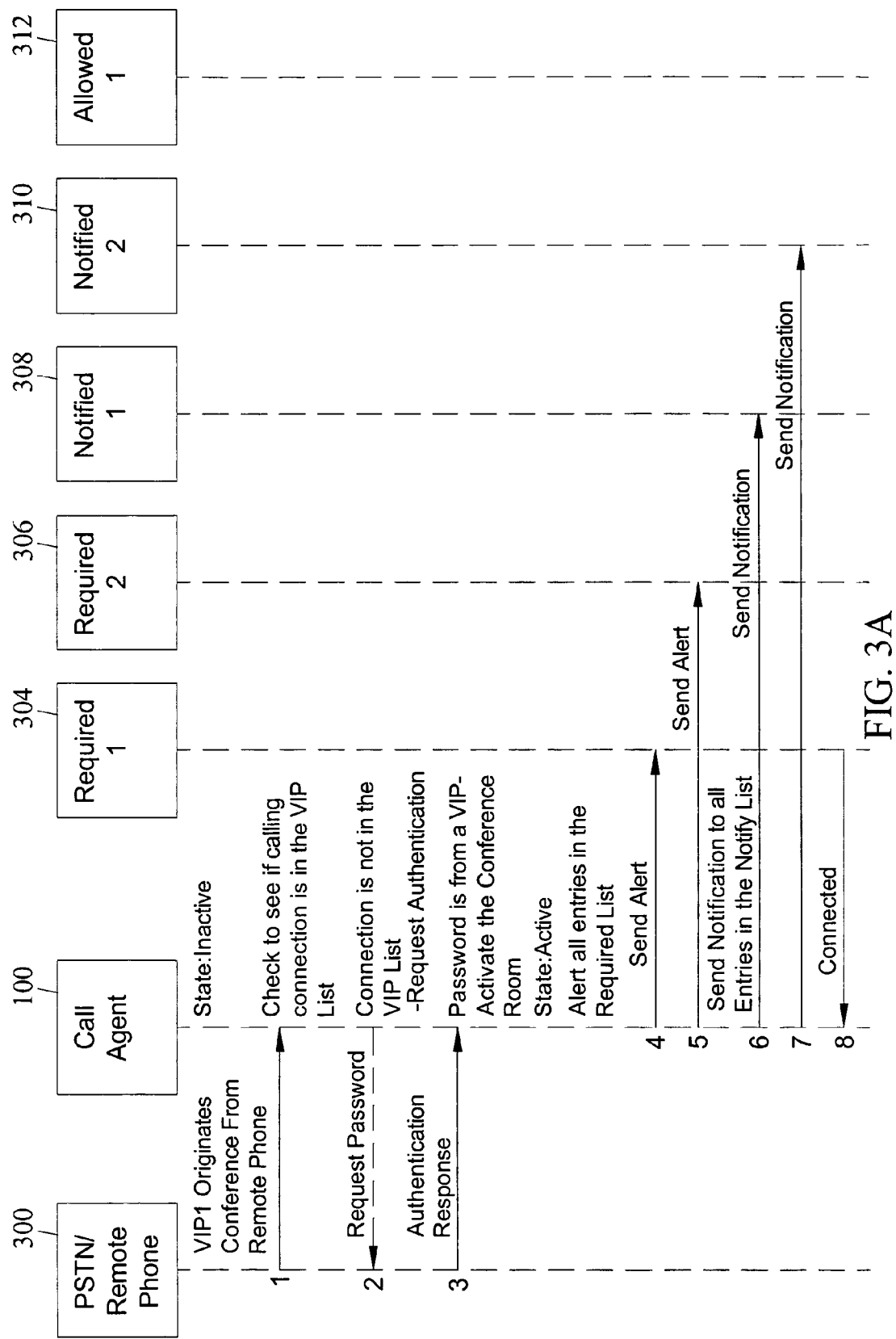
FIGS. 3A and 3B are a message flow diagram illustrating establishment of a conference call having different subscriber participation classes according to an embodiment of the subject matter described herein.
Figure 3B:
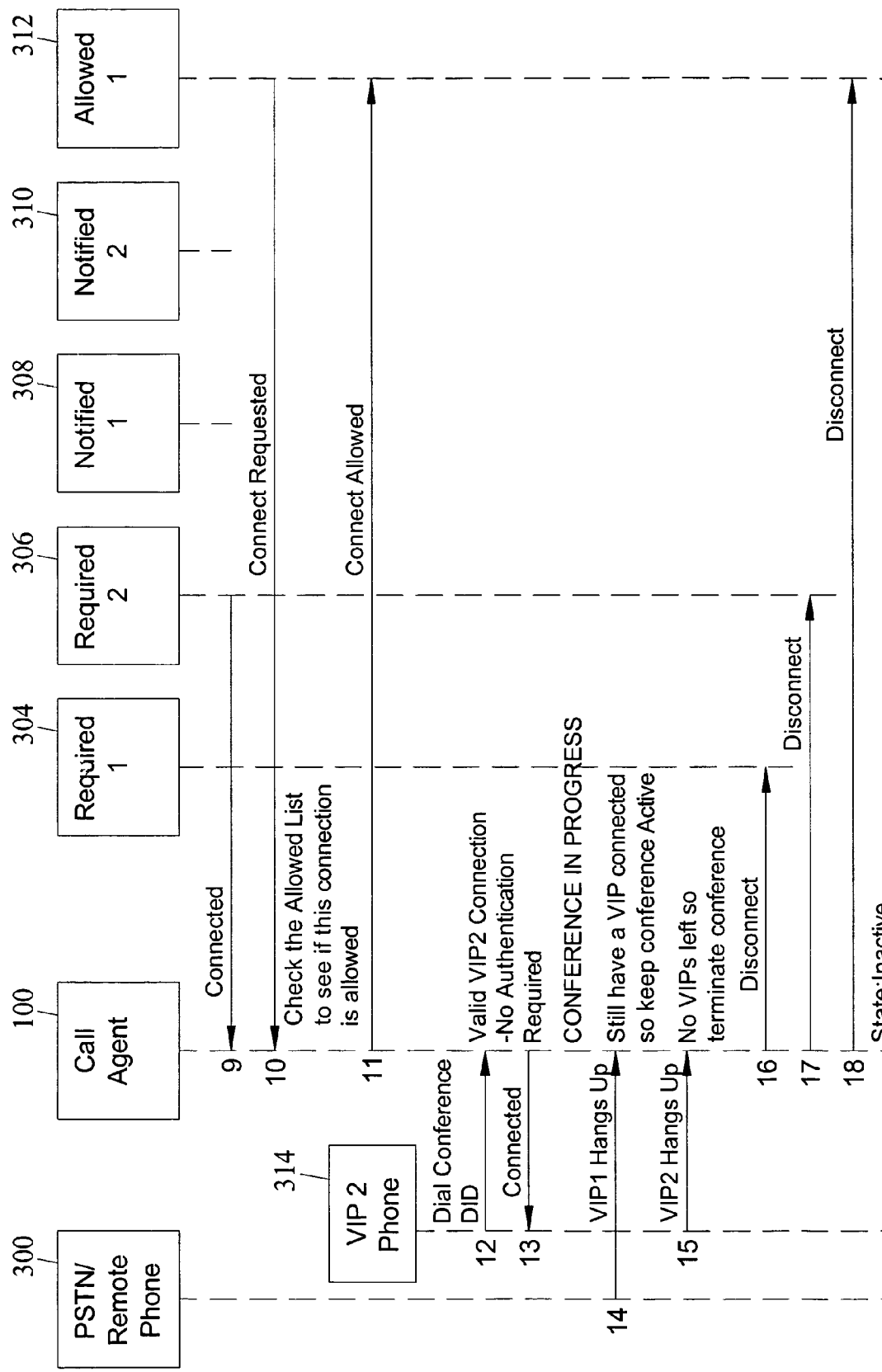

FIGS. 3A and 3B are a message flow diagram illustrating exemplary steps for setting up the conference call having different subscriber participation classes according to an embodiment of the subject matter described herein. In FIGS. 3A and 3B, the conference call is initiated by a remote PSTN phone 300 dialing call agent 100. Participants in the conference call include required participants 304 and 306, notify subscribers 308 and 310, and allowed subscriber 312. In line 1 of the message flow diagram, VIP 1 originates a conference call from PSTN/Remote phone 300. The call is originated by dialing a number associated with call agent 100 illustrated in FIG. 1. In response to receiving the call, call agent 100 determines whether the calling connection is in the VIP list. If the connection is not in the VIP list, in line 2, call agent 100 requests the password from VIP 1. In line 3, VIP 1 sends an authentication response. The state of the conference room is set to active in response to the successful authentication of VIP 1.

In lines 4 and 5 of the message flow diagram, call agent 100 alerts required subscribers 304 and 306 of the conference call and gives them the option of opting in or out of the call. This step may be accomplished by sending an audible or visible message to each required subscriber's phone inviting the subscriber to opt in or out of the call. An example of such a notification is as follows:

You have been invited to join a conference call initiated by VIP 1.
Please select <OPT IN> or <OPT OUT>.

If the required participant selects <OPT IN>, call setup signaling may be initiated with the subscriber's phone and the subscriber may be added to the conference call. If the required participant selects <OPT OUT>, the VIP who initiated the conference call may be notified by an appropriate visible or audible means.

In lines 6 and 7 of the message flow diagram, call agent 100 sends notification of the conference call to members of the notify list. In the illustrated example, subscribers 308 and 310 are members of the notify list. The notification may be visible or audible. In one implementation, protocol agents 110 may send a signal to a subscriber's phone that illuminates a conference indicator light on the subscriber's phone. The illumination may indicate the presence of a conference call that the subscriber can join by pressing a conference button on the subscriber's phone. In an alternate implementation, each subscriber in the notify list may receive a signaling message carrying information regarding the conference call. The type of signaling message used depends on the type of signaling used by subscribers 308 and 310. For example, if subscribers 308 and 310 use SMS capable handsets, the notify messages may be SMS messages sent to the handsets. Similarly, if subscribers 308 and 310 use SIP phones, the notify messages may be SIP Message messages. The content of the notify messages may include any suitable content for inviting subscribers to join the conference call. For example, the content may be as follows:

A conference call between (LIST PARTICIPANTS) began at 0900EST.
Conference status: In progress
Dial in number: 9194938000
Conference duration: 11 m 38 s The above-listed information is not intended to limit the subject matter described herein. Any suitable information that may be useful to subscribers that are to be notified of a conference may be included without departing from the scope of the subject matter described herein. In addition, changes in status of the conference call may be communicated to members of the notify list by repeatedly sending notify messages to the members as the conference call status changes. For example, when a participant is added or leaves the conference call, protocol agents 110 may send messages to members of the notify list to update their participant lists. Such automatic updating allows members of the notify list to join the call when a person they are interested in communicating with joins the call or when a person that they do not wish to communicate with leaves the call.

In lines 8 and 9 of the message flow diagram, required subscribers 304 and 306 indicate to call agent 100 their intention to join the conference call and are automatically connected to the conference call. The automatic connection may be initiated by having call agent 100 perform call signaling with the required subscriber's terminals and having soft bridge 102 set up media stream connections with each of the subscriber terminals. In line 10 of the message flow diagram, an allowed subscriber 312 requests a connection with the conference call. The connection request may be a signaling message that requests initiation of a new call with the direct inward dialing number corresponding to conference bridge 116. For example, if allowed subscriber 312 requests a connection via a SIP phone, the connection request may be a SIP INVITE message. In response to the connection request, call agent 100 may determine whether the connection is allowed. In this example, it is assumed that the connection is allowed. Accordingly, in line 11, call agent 100 sends a connection allowed message to allowed subscriber 312 indicating that the connection is allowed. The message indicating that the connection is allowed may be a 200 OK message if allowed subscriber 312 uses a SIP phone. Once the connection is allowed, call agent 100 and allowed subscriber 312 may exchange call setup signaling messages to add allowed subscriber 312 to the conference call.

In lines 12 and 13 of the message flow diagram, a second VIP, VIP 2, may attempt to access the conference. In this example it is assumed that VIP 2 is a valid VIP and no authentication is required. In line 14 of the message flow diagram, VIP 1 hangs up. However, since there is still a VIP in the conference, the conference is preferably maintained. In line 15 of the message flow diagram, VIP 2 hangs up. In lines 16-18, disconnect messages are sent to all members of the conference, since there are no further VIPs participating in the conference.

Figure 4:
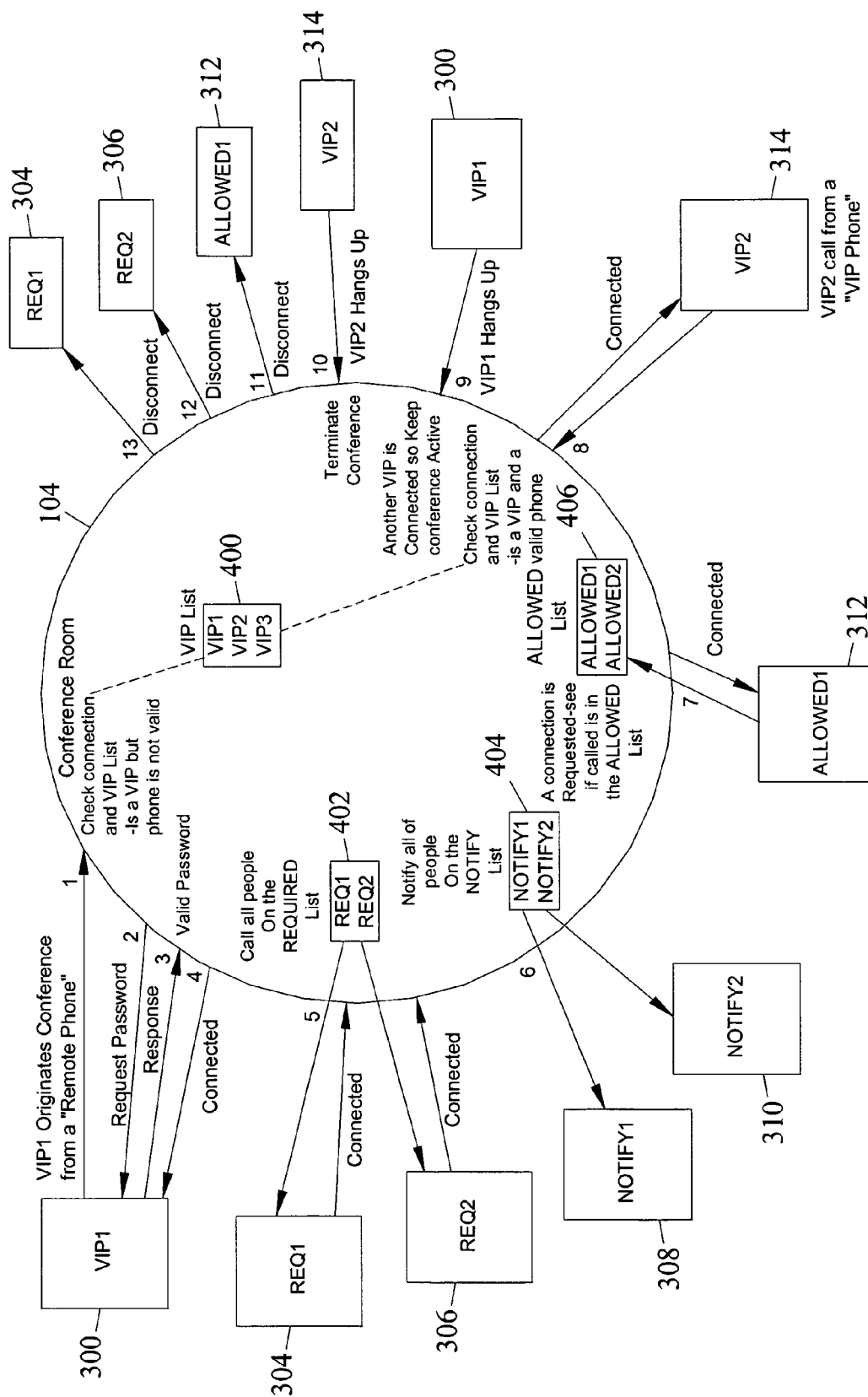
FIG. 4 is a schematic diagram illustrating a conference call established having different subscriber participation classes according to an embodiment the subject matter described herein.

FIG. 4 is schematic diagram including the data structures used in establishment of the conference call corresponding to the message flow of FIGS. 3A and 3B. Referring to FIG. 4, in steps 1-4, VIP 1 uses remote phone 300 to establish conference call by invoking conference room instance 104. VIP 1 is identified as a VIP by VIP list 400. In step 5, required participants 304 and 306 are alerted of the call, opt into the call, and are automatically connected to the call. Required participants are identified by required list 402. In step 6, participants in notify list 404 are notified of the call. In step 7, allowed subscriber 312 dials in to the conference call and is allowed to connect because the allowed subscriber is listed in allowed list 406.

In step 8, VIP 2 314 calls in. VIP 2 314 is verified as a member of VIP list 400 and is hence allowed to connect to the call. In step 9, VIP 1 hangs up. In step 10, VIP 2 hangs up. In steps 11, 12, and 13, subscribers 312, 310, and 308 are respectfully disconnected from the call.

Thus, as described above, the subject matter described herein includes a system that facilitates automatic establishment of a conference call having different subscriber participation classes. By providing different subscriber participation classes, subject matter described herein allows a conference call to be established that includes aspects of a physical conference room.

In one enhancement of the subject matter described herein, call agent 100 may include a presence client for querying a presence server and obtaining up-to-date contact information for subscribers. The up-to-date contact information may be stored in phone instances 108 and used to contact a subscriber when a conference call becomes active.

It will be understood that various details of the subject matter described herein may be changed without departing from the scope of the subject matter described herein. Furthermore, the foregoing description is for the purpose of illustration only, and not for the purpose of limitation—the subject matter described herein being defined by the claims.

What is claimed is:

1. Method for automatically establishing a conference call having a plurality of different subscriber participation classes, the method comprising:
   (a) maintaining at least one per conference call subscriber participation class list indicating subscriber contact information for a conference call and indicating a plurality of different subscriber participation classes for the conference call; and
   (b) establishing the conference call having the different subscriber participation classes in accordance with the at least one per conference call subscriber participation class list;
   wherein maintaining at least one per conference call subscriber participation class list includes maintaining a required list listing subscribers who are mandatory participants in the conference call and a notify list listing subscribers who receive notification of a state of the conference call and participants in the conference call so that the subscribers in the notify list can decide whether to join the conference call, and wherein establishing the conference call includes alerting subscribers in the required list who have not joined the conference call to join the conference call and automatically adding each subscriber in the required list to the conference call in response to receiving a predetermined indication from each subscriber in the required list and allowing subscribers in the notify list who received the notification to join the conference call.

2. The method of claim 1 wherein maintaining at least one per conference call subscriber participation class list includes maintaining an allowed list listing subscribers who can join the conference call by dialing in and wherein establishing the conference call includes permitting the subscribers in the allowed list to dial in to the conference call.

3. The method of claim 1 wherein sending the notification to the subscribers in the notify list includes sending a signaling message including a payload indicating a state of the conference call and participant in the conference call.

4. The method of claim 3 wherein sending a signaling message includes sending a short message service (SMS) message.

5. The method of claim 3 wherein sending a signaling message includes sending a session initiation protocol (SIP) message.

6. The method of claim 1 comprising continually updating the subscribers in the notify list of a current state of the conference call.

7. The method of claim 1 wherein sending the notification to the subscribers in the notify list includes sending at least one of an audible and a visible indication to phones of the subscribers in the notify list.

8. The method of claim 1 wherein maintaining at least one per conference call subscriber participation class list includes maintaining a very important person (VIP) list listing subscribers with conference call control privileges and wherein establishing the conference call includes calling the subscribers in the required list in response to receiving a conference call initiation from a first subscriber in the VIP list.

9. The method of claim 8 comprising automatically disconnecting all subscribers from the conference call in response to receiving a termination from a last VIP participating in the conference call.

10. The method of claim 9 comprising, after receiving the initiation from the first subscriber in the VIP list, receiving an initiation from a second subscriber in the VIP list, and adding the second to the conference call.

11. The method of claim 1 wherein maintaining at least one per conference call subscriber participation class list includes maintaining a single per conference call subscriber participation class list including entries storing subscriber contact information and subscriber participation classes.

12. The method of claim 1 wherein maintaining at least one per conference call subscriber participation class list includes maintaining a plurality of per conference call subscriber participation class lists, each list corresponding to a subscriber participation class for the conference call.

13. The method of claim 1 comprising dynamically updating the subscriber contact information in the at least one per conference call subscriber participation class list based on presence information obtained from a presence server.

14. The method of claim 1 wherein establishing the conference call includes establishing the conference call in response to a first subscriber dialing a direct inward dialing number.

15. The method of claim 1 wherein establishing the conference call includes establishing the conference call using a call agent separate from subscriber terminals.

16. The method of claim 1 wherein establishing the conference call includes establishing the conference call using a call agent located on an initiating subscriber's terminal.

17. A system for automatically establishing a conference call having a plurality of different subscriber participation classes, the system comprising:
   (a) a conference room instance storing at least one per conference call subscriber participation class list indicating subscriber contact information for a conference call and indicating a plurality of different subscriber participation classes for the conference call; and
   (b) at least one protocol agent for establishing the conference call having the different subscriber participation classes in accordance with the conference call subscriber participation class list;
   wherein the conference room instance includes a required list listing mandatory participants in the conference call and a notify list listing subscribers who receive notification of a state of the conference call and participants in the conference call so that the subscribers in the notify list can decide whether to join the conference call, and wherein the at least one protocol agent is adapted to alert subscribers in the required list who have not joined the conference call to join the conference call and to automatically add each subscriber in the required list to the conference call in response to receiving a predetermined indication from each subscriber in the required list and allowing subscribers in the notify list who received the notification to join the conference call.

18. The method of claim 17 wherein the at least one per conference call subscriber participation class list includes an allowed list defining subscribers who can join the conference call by dialing in and wherein the at least one protocol agent is adapted to permit subscribers in the allowed list to dial in to the conference call.

19. The system of claim 17 wherein the notification includes a signaling message including a payload indicating a state of the conference call and listing participants in the conference call.

20. The system of claim 19 wherein the signaling message comprises a short message service (SMS) message.

21. The system of claim 19 wherein the signaling message comprises a session initiation protocol (SIP) message including a payload portion for storing text indicating the state of the conference call and the participants in the conference call.

22. The system of claim 19 wherein the at least one protocol agent is adapted to dynamically update the subscribers in the notify list of the state of the conference call and the participants in the conference call.

23. The system of claim 17 wherein the notification includes at least one of an audible and a visual indication sent to phones of subscribers in the notify list.

24. The system of claim 17 wherein the at least one per conference call subscriber participation class list includes a very important person (VIP) list defining subscribers with conference call control privileges and wherein the at least one protocol agent is adapted to automatically call the subscribers in the required list in response to receiving a conference call initiation from a first subscriber in the VIP list.

25. The system of claim 24 wherein the at least one call agent is adapted to automatically disconnect all participants to the conference call when a last remaining VIP in the conference call leaves the conference call.

26. The system of claim 24 wherein the at least one protocol agent is adapted to allow multiple VIPs to participate in the conference call.

27. The system of claim 17 wherein the at least one per conference call subscriber participation class list comprises a single list indicating subscriber contact information and corresponding participation class information.

28. The system of claim 17 wherein the at least one per conference call participation class list includes a plurality of different per conference call subscriber participation class lists, each list corresponding to one of the per conference call subscriber participation classes.

29. The system of claim 17 comprising a presence entity for obtaining presence information regarding the subscribers and automatically updating subscriber contact information indicated by the per conference call subscriber participation class list.

30. The system of claim 17 wherein the conference room instance is located on a subscriber communication terminal.

31. The system of claim 17 wherein the conference room instance is a component of a conferencing system separate from a subscriber communications terminal.

32. A computer program product comprising computer-executable instructions embodied in a computer-readable medium for performing steps comprising:
   (a) maintaining at least one per conference call subscriber participation class list indicating subscriber contact information for the conference call and indicating a plurality of different subscriber participation classes for the conference call; and
   (b) establishing the conference call having the different subscriber participation classes in accordance with the at least one per conference call subscriber participation class list;
   wherein maintaining at least one per conference call subscriber participation class list includes maintaining a required list listing subscribers who are mandatory participants in the conference call and a notify list listing subscribers who receive notification of a state of the conference call and participants in the conference call so that the subscribers in the notify list can decide whether to join the conference call, and wherein establishing the conference call includes alerting subscribers in the required list who have not joined the conference call to join conference call and automatically adding each subscriber in the required list to the conference call in response to receiving a predetermined indication from each subscriber in the required list and allowing subscribers in the notify list who received the notification to join the conference call.

33. The computer program product of claim 32 wherein maintaining at least one per conference call subscriber participation class list includes maintaining an allowed list defining a list of subscribers who can join the conference call by dialing in and wherein establishing the conference call includes permitting subscribers in the allowed list to dial in to the conference call.

34. The computer program product of claim 32 wherein sending the notification to the subscribers in the notify list includes sending a signaling message including a payload indicating a state of the conference call and participants in the conference call.

35. The computer program product of claim 34 wherein sending a signaling message includes sending a short message service (SMS) message.

36. The computer program product of claim 34 wherein sending a signaling message includes sending a session initiation protocol (SIP) message.

37. The computer program product of claim 32 comprising continually updating the subscribers in the notify list of a current state of the conference call.

38. The computer program product of claim 32 wherein sending the notification to the subscribers in the notify list includes sending at least one of an audible and a visible indication to phones of the subscribers in the notify list.

39. The computer program product of claim 32 wherein maintaining at least one per conference call subscriber participation class list includes maintaining a very important person (VIP) list listing subscribers with conference call control privileges and wherein establishing the conference call includes calling the subscribers in the required list in response to receiving a conference call initiation from a first subscriber in the VIP list.

40. The computer program product of claim 39 comprising automatically disconnecting all subscribers from the conference call in response to receiving a termination from a VIP participating in the conference call.

41. The computer program product of claim 40 comprising, after receiving the initiation from the first subscriber in the VIP list, receiving an initiation from a second subscriber in the VIP list, and adding the second subscriber to the conference call.

42. The computer program product of claim 32 wherein maintaining at least one per conference call subscriber participation class list includes maintaining a single per conference call subscriber participation class list including entries corresponding to subscriber contact information and subscriber participation classes.

43. The computer program product of claim 32 wherein maintaining at least one per conference call subscriber participation class list includes maintaining a plurality of per conference call subscriber participation class lists, each list corresponding to a subscriber participation class for the conference call.

44. The computer program product of claim 32 comprising dynamically updating the subscriber contact information in the at least one per conference call subscriber participation class list based on presence information obtained from a presence server.

45. The computer program product of claim 32 wherein establishing the conference call includes establishing the conference call in response to a first subscriber dialing a direct inward dialing number.

46. The computer program product of claim 32 wherein establishing the conference call includes establishing the conference call using a call agent separate from subscriber terminals.

47. The computer program product of claim 32 wherein establishing the conference call includes establishing the conference call using a call agent located on an initiating subscriber's terminal.

\* \* \* \* \*